(12) United States Patent
Fell et al.

(10) Patent No.: US 9,291,260 B1
(45) Date of Patent: Mar. 22, 2016

(54) ROLLING DOWNHILL SHIFT CONTROL OF A TRANSMISSION

(71) Applicant: GM GLOBAL TECHNOLOGY OPERATIONS LLC, Detroit, MI (US)

(72) Inventors: Brandon Fell, Milford, MI (US); Craig J. Hawkins, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/529,401

(22) Filed: Oct. 31, 2014

(51) Int. Cl.
*F16H 61/688* (2006.01)
*F16H 61/02* (2006.01)
*F16H 61/16* (2006.01)
*F16H 61/04* (2006.01)

(52) U.S. Cl.
CPC ........ *F16H 61/0213* (2013.01); *F16H 61/0403* (2013.01); *F16H 61/16* (2013.01); *F16H 61/688* (2013.01); *F16H 2061/0227* (2013.01); *F16H 2061/0234* (2013.01); *F16H 2061/163* (2013.01)

(58) Field of Classification Search
None
See application file for complete search history.

(56) References Cited

U.S. PATENT DOCUMENTS

| 2010/0048354 | A1* | 2/2010 | Leibbrandt | F16H 61/0059 477/172 |
| 2012/0010046 | A1* | 1/2012 | Yacoub | F16H 61/061 477/86 |
| 2012/0101697 | A1* | 4/2012 | Hawkins | F16H 61/061 701/51 |
| 2013/0166164 | A1* | 6/2013 | Moebus | F16H 59/66 701/65 |

* cited by examiner

*Primary Examiner* — Edwin A Young
(74) *Attorney, Agent, or Firm* — Quinn Law Group, PLLC

(57) ABSTRACT

A method of controlling a downhill rolling shift sequence (DRSS) of a vehicle having an engine and a dual-clutch transmission (DCT) includes initiating a DRSS upon detecting a rolling downhill condition of the vehicle in an initial gear state, identifying an exit gear state corresponding to the initial gear state, shifting the DCT to a rolling neutral state when a speed of an initial gear input shaft is equal to an idle speed of the engine, initiating synchronization of the engine speed with the speed of an exit gear input shaft when the shaft speed is equal to the engine idle speed, and shifting the DCT from the rolling neutral state to the exit gear state when the synchronized speed of the engine and the exit gear input shaft is equal to a calibrated exit speed defined by the exit gear state. A system for controlling the DRSS is provided.

20 Claims, 3 Drawing Sheets

ROLLING DOWNHILL SHIFT CONTROL OF A TRANSMISSION

TECHNICAL FIELD

The present disclosure relates to the control of a rolling downhill shift maneuver in a transmission of a vehicle.

BACKGROUND

A dual-clutch transmission (DCT) combines features of manual and automatic transmissions. In a DCT, a first input clutch is applied to a first gear input shaft of the transmission to engage oddly-numbered gear sets of a gearbox, i.e., $1^{st}$, $3^{rd}$, $5^{th}$, and $7^{th}$ gear, while a second input clutch is applied to a second gear input shaft of the transmission to engage the evenly-numbered gear sets such as $2^{nd}$, $4^{th}$, $6^{th}$, and Reverse gear. Typically, when a vehicle starts rolling down an incline, e.g., downhill, from a stop with no acceleration pedal input, the vehicle transmission is initially in a rolling neutral state which provides no engine braking, until the transmission engages $1^{st}$ gear and provides engine braking. The transmission then re-enters the rolling neutral state, which releases the engine braking and causes an output feel from the transmission during this shift sequence, which may be a harsh output perceptible by the vehicle user.

SUMMARY

Using the control method described herein, when a vehicle starts rolling down an incline from a stop with no acceleration pedal input, e.g., is in a rolling downhill condition, the vehicle transmission will be shifted from an initial gear state to a rolling neutral state only when the speed of the initial gear input shaft is equal to, e.g., crosses an engine idle speed, such that when the transmission is shifted into the rolling neutral state, engine braking is negligible. While the transmission is in the rolling neutral state, the engine idles until the speed of an exit gear input shaft reaches, e.g., is equal to, the engine idle speed, at which point the engine speed matches the speed of the exit gear input shaft to prepare for an upcoming torque-interrupt shift to a predetermined exit gear state. The exit gear input shaft corresponds to the predetermined exit gear defined by a vehicle controller and the rolling downhill condition. The transmission remains in the rolling neutral state until the matched speed of the engine and the exit gear input shaft reaches, e.g., is equal to, a calibrated exit speed, at which time a shift is initiated to engage the clutch corresponding to the exit gear input shaft and terminate the rolling neutral state. The exit gear clutch is ramped on with negligible engine braking and a torque-interrupt shift is completed to shift the transmission to the exit gear state. If the driver steps in, e.g., if a driver input such as a throttle request or braking request is received via an input to the accelerator pedal or brake pedal, at any point while in the rolling downhill condition, a launch shift shall be performed to shift the transmission into a gear state corresponding to the driver input. Using this control method, the rolling neutral state is only entered during a rolling downhill condition when engine braking is negligible, e.g., when the shaft speed of the initial gear shaft crosses the engine idle speed, and the transmission remains in the rolling neutral state until the engine speed and the speed of a predetermined exit gear shaft are matched prior to engaging the exit gear clutch to initiate the shift from the rolling neutral state to the exit gear state. This control method is therefore advantaged by avoiding any interim shifting out of and back into the rolling neutral state during the rolling downhill condition, and by shifting in and out of the rolling neutral state with negligible or no engine braking, such that the vehicle user does not experience any output feel or harshness from the transmission during the rolling downhill condition and the rolling downhill shift sequence.

A vehicle is disclosed herein that includes a dual-clutch transmission (DCT) and a controller. The controller is programmed to control a downhill rolling shift of the DCT when used in a vehicle as set forth herein. In an example embodiment, the vehicle includes an internal combustion engine, a DCT, and a controller. The DCT includes a pair of input clutches, first/odd and second/even input shafts, and a gearbox containing separate oddly-numbered and evenly-numbered gear sets on the corresponding first and second shafts. Application of a designated one of the input clutches connects the engine to a corresponding one of the oddly-numbered or evenly-numbered gear sets on one of the two input shafts of the DCT. In the example DCT described herein, a first input clutch is applied to a first input shaft of the transmission to engage oddly-numbered gear sets of a gearbox, i.e., $1^{st}$, $3^{rd}$, $5^{th}$, and $7^{th}$ gear, while a second input clutch is applied to a second input shaft of the transmission to engage the evenly-numbered gear sets such as $2^{nd}$, $4^{th}$, $6^{th}$, and Reverse gear. The controller, which is in communication with the two input clutches, includes a processor and tangible, non-transitory memory on which is recorded instructions for detecting a rolling downhill condition and executing a downhill rolling shift sequence (DRSS) from an initial gear state to a rolling neutral state to an exit gear state, when a rolling downhill condition is detected by the controller. The controller, in this example, includes instructions for at least a first DRSS referred to herein as a forward DRSS and a second DRSS referred to herein as a reverse DRSS, where the controller selects one of the forward DRSS and the reverse DRSS based on the initial gear state of the vehicle at the initiation of the rolling downhill condition. For example, the controller detecting a rolling downhill condition with the vehicle in a forward gear state will execute a forward DRSS. The controller detecting a rolling downhill condition with the vehicle in a reverse gear state will execute a reverse DRSS.

In this embodiment, execution of the instructions causes the controller to detect the rolling downhill condition, to identify the initial gear state of the vehicle at the initiation of the rolling downhill condition, to select a DRSS corresponding to the initial gear state, and to command execution of the selected DRSS by the DCT. The controller commands the selected DRSS of the DCT from the initial gear state to a rolling neutral state to an exit gear state via a calibrated shift profile corresponding to the selected DRSS, i.e., a stored torque handoff profile describing the required offgoing and oncoming clutch torques for shifting from the initial gear state to an interim rolling neutral state prior to achieving the exit gear state. The stored torque handoff profile for the DRSS may be referred to herein as a DRSS profile. Engine speed monitoring and engine speed control are used in controlling some shift maneuvers during the DRSS. The DRSS defined by the initial gear state and selected by the controller identifies a predetermined exit gear state corresponding to the initial gear state, commands speed matching of the exit gear input shaft and the engine speed when the DCT is in the rolling neutral state, identifies a predetermined engine speed at which the controller commands initiation of a shift of the DCT from a rolling neutral state to the exit gear state. The shift from the initial gear state to the rolling neutral state is initiated by a gradual ramping off of the initial gear clutch from the initial gear shaft, and the shift from the rolling neutral state to the exit gear state is initiated by a gradual ramping on of the exit gear clutch to the exit gear shaft, where the shift to the exit gear state may be a torque-interrupt shift. Gradual ramping off of the initial gear clutch and gradual ramping on of the exit gear clutch minimizes and/or prevents generation of an output feel to the driver during execution of the DRSS.

The term "downhill rolling shift," which may also be referred to herein as a downhill rolling shift sequence (DRSS), refers to a controlled shift sequence from an initial gear state to a rolling neutral state to an exit gear state which is performed while the vehicle is in a rolling downhill condition. A "rolling downhill condition" refers to a condition where the vehicle is rolling down an incline from a stopped condition, where the vehicle is in an initial gear state at the time the vehicle begins rolling downhill from the stopped condition, and where there is no throttle request, e.g., there is no driver input to the accelerator such that the throttle level is at zero percent (Th %=0), and there is no braking input, e.g., there is no driver input to the vehicle brake such that the braking level is at zero percent (B %=0). The term "initial gear state" refers to the gear state the DCT is in at the time the rolling downhill condition is initiated. In the "initial gear state" an "initial gear clutch" is applied to an "initial gear shaft" to engage an "initial gear set" connected to the "initial gear shaft." For example, using an example DCT described herein, the DCT in a forward rolling downhill condition may be in an "initial gear state" of 1st gear, such that, for the example DCT described herein, the "initial gear shaft" refers to the first input shaft of the DCT, the "initial gear clutch" refers to the first clutch of the DCT, and the "initial gear set" is the 1st gear set of the DCT, such that in the initial gear state of 1st gear, the first clutch is applied to the first input shaft to engage the 1st gear set of the DCT. Likewise, the term "exit gear state" refers to the gear state the DCT is shifted to during execution of the downhill rolling shift sequence (DRSS). In the "exit gear state" an "exit gear clutch" is applied to an "exit gear shaft" to engage an "exit gear set" connected to the "exit gear shaft." For example, using an example DCT described herein, the DCT in a forward rolling downhill condition may be shifted from the initial gear state to a rolling neutral state, and from the rolling neutral state to an "exit gear state" of $2^{nd}$ gear, such that, for the example DCT described herein, the "exit gear shaft" refers to the second input shaft of the DCT, the "exit gear clutch" refers to the second clutch of the DCT, and the "exit gear set" is the 2nd gear set of the DCT, such that in the exit gear state of 2nd gear, the second clutch is applied to the second input shaft to engage the 2nd gear set of the DCT. The term "rolling neutral state" refers to a condition where both the first and second clutches of the DCT are neutralized such that neither of the first and second clutches are fully engaged with their respective first and second input shafts, and such that there is no engine braking.

The controller is programmed with a plurality of different calibrated DRSS profiles, including at least one forward DRSS profile for controlling a forward DRSS exiting to a forward gear when the vehicle is in a forward gear at the initiation of the rolling downhill condition, and at least one reverse DRSS profile for controlling a reverse DRSS when the vehicle is in a reverse gear at the initiation of the rolling downhill condition. In each DRSS profile, engine speed control may be used for speed matching of the engine speed to the speed of the exit gear shaft during execution of the DRSS to minimize and or prevent transmitting an output feel to the driver during execution of the DRSS.

In one example, a forward DRSS profile may include a first shift maneuver to ramp off the initial gear clutch from the initial input shaft to transition the DCT to a rolling neutral state, and a second shift maneuver to ramp on the exit gear clutch to the exit input shaft to transition the DCT from the rolling neutral state to the exit gear. The controller is programmed to shift the DCT to ramp off the initial gear clutch from the initial input shaft to transition the DCT to a rolling neutral state when the shaft speed of the initial input shaft reaches the engine idle speed. A temporary increase in engine speed is requested by the controller, such as via transmission of a request to an engine control module, while the DCT is in the rolling neutral state, and when the speed of the exit input shaft reaches the engine idle speed, in order to synchronize, e.g., speed match, the engine speed with input shaft speed of the exit input shaft. The controller is programmed to shift the DCT to ramp on the exit gear clutch to the exit input shaft to transition the DCT from the rolling neutral state to the exit gear, where at the time the exit gear clutch is ramped on to the exit input shaft, the speed of the exit gear and the engine speed are matched and at a calibrated exit speed. The calibrated exit speed, by way of example, is greater than the engine idle speed. The calibrated exit speed may also be referred to herein as an exit speed target.

In a first example of a forward DRSS profile, the forward DRSS profile identifies the forward exit gear state as $2^{nd}$ gear, such that during execution of the example forward DRSS profile, the controller requests an increase in engine speed when the DCT is in rolling neutral and the speed of the second input shaft reaches the engine idle speed, and speed matches the engine speed and second input shaft. The DCT in a second shift maneuver applies the second clutch to the second input shaft when the speed of the second input shaft is matched to the engine speed and reaches a calibrated exit speed, to engage the $2^{nd}$ gear set and shift the DCT from rolling neutral to $2^{nd}$ gear, the example forward exit gear state.

In a second example of a forward DRSS profile, the forward DRSS profile identifies the forward exit gear state as 3rd gear, such that during execution of this example forward DRSS profile, the controller requests an increase in engine speed when the DCT is in rolling neutral and the speed of the second input shaft reaches the engine idle speed, and speed matches the engine speed and second input shaft. In this example, the DCT in the second shift maneuver applies the first clutch to the first input shaft when the speed of the first input shaft is matched to the engine speed and reaches a calibrated exit speed, to engage the 3rd gear set and shift the DCT from rolling neutral directly to 3rd gear, the forward exit gear state in this example.

In an example of a reverse DRSS profile, the initial gear state is reverse gear, and the final gear state is reverse gear, such that for the example DCT described herein, the second clutch is respectively the initial clutch and the exit clutch, the second input shaft of the DCT is respectively the initial gear shaft and the exit gear shaft, and the reverse gear set is respectively the initial gear set and the exit gear set for execution of the reverse DRSS profile. The example reverse DRSS profile includes a first shift maneuver to ramp off the initial gear clutch (the second clutch) from the initial gear shaft (the second input shaft) to transition the DCT to a rolling neutral state, where the first shift maneuver is initiated when the speed of the initial gear shaft (the second input shaft) reaches the engine idle speed. Concurrent with ramping off the second clutch and transition the DCT to rolling neutral, the controller requests an increase in engine speed to speed match the engine speed and the speed of the exit gear shaft, e.g., the second input shaft. When the speed of the engine and the second input shaft reach a calibrated exit speed, the controller according to the reverse DRSS profile executes a second shift maneuver to ramp on the exit gear clutch (the second clutch)

to the exit gear shaft (the second input shaft) to transition the DCT from the rolling neutral state to the exit gear, which is the reverse gear of the DCT. The calibrated exit speed is greater than the engine idle speed.

A system and method are also disclosed. The system includes the DCT and the controller noted above. The method includes detecting the rolling downhill condition, including processing driver inputs via the controller, identifying the initial gear state, selecting the DRSS profile corresponding to the initial gear state, and executing the DRSS according to the selected DRSS profile. The method also includes aborting the execution of the DRSS immediately upon detecting a driver input during the rolling downhill condition, and immediately launching a shift to a gear state defined by a calibrated shift profile corresponding to the detected driver input. The driver input may be, for example, a driver input such as throttle level (Th %) requested via a force applied to, or a corresponding percentage of travel of, an accelerator pedal or a braking level (arrow B %) requested via a force applied to, or a corresponding percentage of travel of, a brake pedal, or a combination of these. The calibrated shift profile describes the required oncoming and offgoing clutch torques needed for achieving the gear state corresponding to the driver input.

The above features and advantages, and other features and advantages, of the present disclosure are readily apparent from the following detailed description of some of the best modes and other particular embodiments for carrying out the invention, as defined in the appended claims, when taken in connection with the accompanying drawings.

BRIEF DESCRIPTION OF THE DRAWINGS

FIG. 3A is a first example torque handoff profile for control of a forward DRSS;

FIG. 3B is a second example torque handoff profile for control of a forward DRSS; and FIG. 3C is an example torque handoff profile for control of a reverse DRSS.

DETAILED DESCRIPTION

Figure 1:
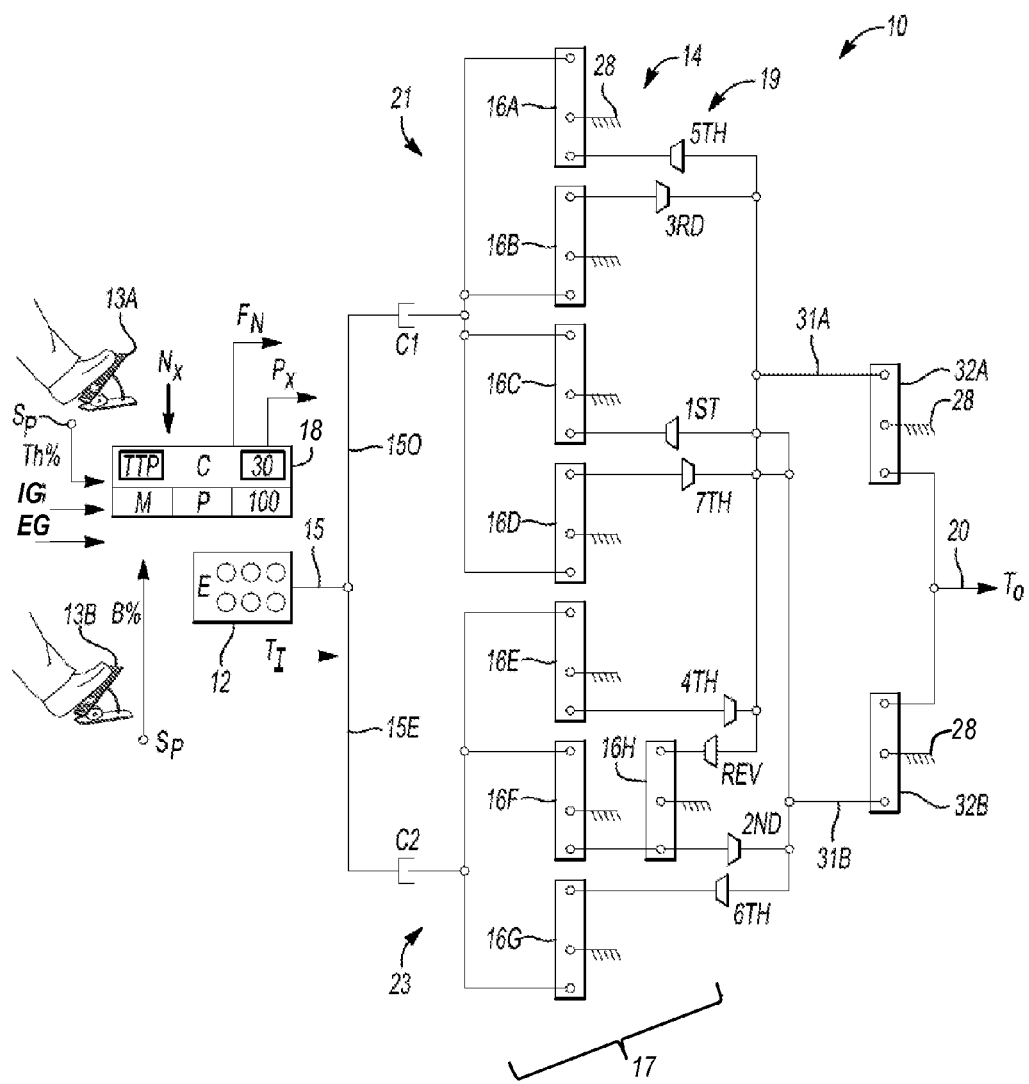
FIG. 1 is a schematic illustration of an example vehicle having a dual-clutch transmission (DCT) and a controller programmed to control a downhill rolling shift sequence (DRSS) of the DCT as set forth herein.

Referring to the drawings, wherein like reference numbers refer to like components throughout the several Figures, an example vehicle 10 is shown schematically in FIG. 1. The vehicle 10 includes an internal combustion engine (E) 12 and a dual-clutch transmission (DCT) 14. The engine 12 is responsive to a received throttle level (arrow Th %) requested via a force applied to, or a corresponding percentage of travel of, an accelerator pedal 13A. The throttle level (arrow Th %) requests a relative level of input torque (arrow $T_I$) from the engine 12. The force/travel of the accelerator pedal 13A may be measured via a force or position sensor (Sr) in the conventional manner. The engine 12 also responds with a braking level (arrow B %) from a brake pedal 13B, with the braking level (arrow B %) likewise detected via a force or position sensor (Sp). In response to receipt of the throttle level (arrow Th %) by a controller (C) 18, e.g., an engine control module, the engine 12 delivers the input torque (arrow $T_I$) to the DCT 14 via an engine input shaft 15, or more precisely, one of two different engine input shafts 15E and 15O.

The example DCT 14 of FIG. 1 may include a gearbox 17 and two independently-operated, non-lubricated respective first and second input clutches C1 and C2. While omitted from FIG. 1 for illustrative clarity, each input clutch C1 and C2 may include a center plate containing spaced friction discs, plates, or other suitable friction devices. The input clutches C1 and C2 are selectively compressed together via a fluid-actuated clutch piston or other suitable clutch actuator(s) (not shown), with these pistons having an axial position that is used in the overall control of the input clutches C1 and C2. Associated electronic and hydraulic clutch control devices (not shown) ultimately control the shift operations of the DCT 14, including change-of-mind shifts as noted above, in response to instructions or commands from the controller (C) 18.

In the example DCT 14, the first input clutch C1 may be used to connect the engine 12 to any of the oddly-numbered gear sets 16A, 16B, 16C, and 16D, each having a node connected to a stationary member 28 of the DCT 14, for instance to establish respective fifth ($5^{th}$), third ($3^{rd}$), first ($1^{st}$), and seventh ($7^{th}$) gears in the example 7-speed transmission design of FIG. 1. The second input clutch C2 connects the engine 12 to reverse or any of the respective evenly-numbered gear sets 16E, 16F, and 16G, e.g., fourth ($4^{th}$), second ($2^{nd}$), and sixth ($6^{th}$) gears in the same example 7-speed transmission 14, as well as a reverse (R) gear set 16H. Clutch forks and synchronizers 19 are shown schematically for the various gear sets. Using this type of gear arrangement, the DCT 14 can be rapidly shifted through its available range of gears without completely interrupting the flow of power from the engine 12.

In the example vehicle 10 of FIG. 1, the DCT 14 also includes an output member 20 that is connected to a set of drive wheels (not shown). The output member 20 ultimately transmits output torque (arrow $T_O$) from the DCT 14 to the drive wheels in order to propel the vehicle 10. The DCT 14 may include a first gear input shaft 21 that is connected to the output side of the first input clutch C1, and also a second gear input shaft 23 that is connected to the output side of the second input clutch C2. The first gear input shaft 21 is connected to only the oddly-numbered gear sets 16A, 16B, 16C, and 16D. Likewise, the second gear input shaft 23 is connected to only the evenly-numbered gear sets 16E, 16F, and 16G and the reverse gear set 16H. The DCT 14 further includes upper and lower main shafts 31A and 31B, respectively, which may be connected to respective final drive gear sets 32A and 32B. The final drive gear sets 32A and 32B provide any required final gear reduction.

The controller 18 of FIG. 1 may be embodied as a microprocessor-based computing device or devices having a processor P and memory M, including but not necessarily limited to magnetic or optical read only memory (ROM), random access memory (RAM), electrically-erasable programmable read-only memory (EEPROM), flash memory, etc., and any required circuitry. The circuitry may include high-speed clocks, analog-to-digital (A/D) circuitry, digital-to-analog (D/A) circuitry, a digital signal processor, transceivers configured to transmit and receive any required signals during the overall control of the DCT 14, and the necessary input/output (I/O) devices and other signal conditioning and/or buffer circuitry.

The controller 18 determines or processes driver inputs such as throttle level (arrow Th %), braking level (arrow B %), vehicle speed (arrow $N_X$), the initial gear (arrow IG), i.e., the gear state the DCT 14 is in at the initiation of the rolling downhill condition, and an exit gear (arrow EG) to be attained. The controller 18 ultimately outputs a clutch position control signal (arrow $P_X$) to the designated input clutch C1 or C2 for a given shift to set the position of the designated input clutch C1 or C2, and fork control signals (arrow $F_N$) to the corresponding clutch forks and synchronizers 19 for the desired gear. Thus, the input clutches C1 and C2 are referred to as "position-controlled" clutches.

The clutch position control signal (arrow $P_X$) sets the axial or linear position of a clutch apply piston or other actuator device of the input clutch C1 or C2 for applying the input clutch C1 or C2, whichever one acts as the oncoming clutch during a requested shift. A torque-to-position (TTP) table and calibrated torque profiles 30, for instance the example downhill rolling shift sequence (DRSS) profiles 30A-30C of FIGS. 3A-3C, respectively, may be recorded in memory M of the controller 18 and referenced to determine the required apply position for the first and second input clutches C1 and C2, as is well known in the art of position-controlled clutches.

As explained below with reference to FIGS. 2 and 3A-3C, the controller (C) 18 is configured, i.e., specially programmed in software and equipped in hardware, detect a rolling downhill condition of the vehicle 10, to select one of various downhill rolling shift sequence (DRSS) profiles 30A, 30B, and 30C stored on the memory (M) of the controller 18, based on the initial gear state (IG) of the vehicle 10 in the rolling downhill condition, and to control execution of the downhill rolling shift sequence (DRSS) of the selected DRSS profile 30 by the DCT 14 in a manner that substantially reduces shift harshness by minimizing and/or eliminating engine braking during execution of the downhill rolling shift sequence (DRSS), such that negligible output feel is transmitted to the driver of the vehicle 10 for the duration of the rolling downhill condition and/or during execution of the DRSS.

Figure 2:
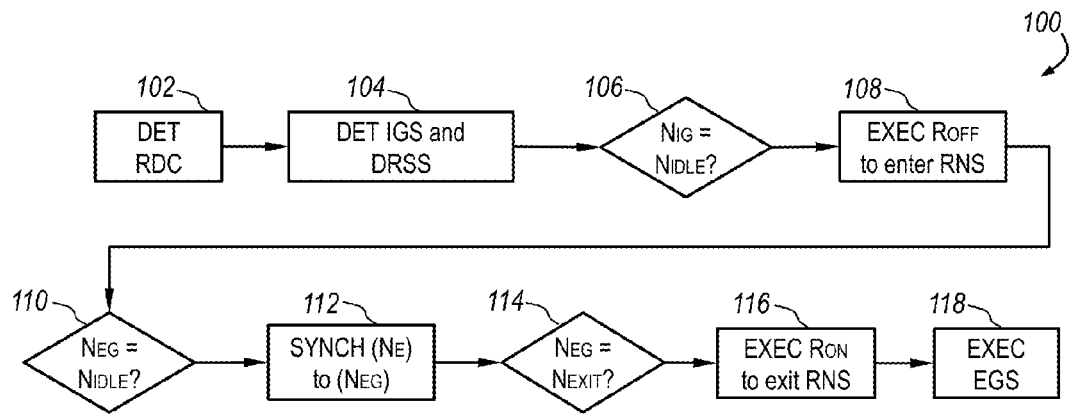
FIG. 2 is a schematic logic flow chart describing an example embodiment of a downhill rolling shift sequence (DRSS) of the DCT shown in FIG. 1.
Figure 3A:
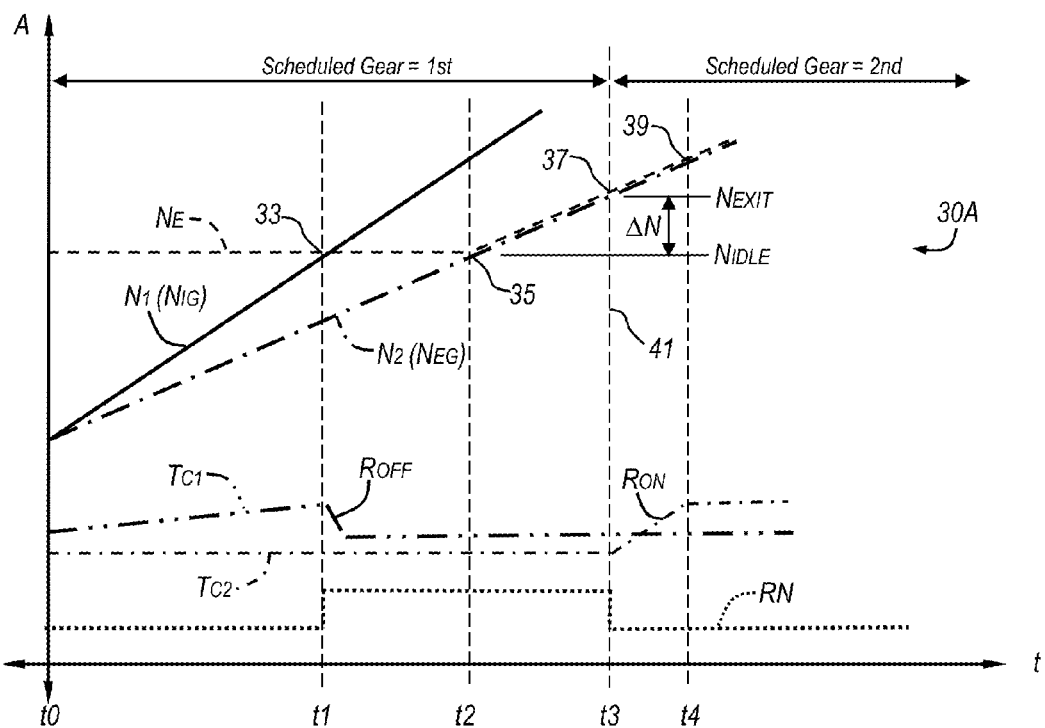
FIGS. 3A-C are torque handoff profiles describing vehicle control parameters for control of various example downhill rolling shift sequences of the DCT shown in FIG. 1, with amplitude depicted on the vertical axis and time depicted on the horizontal axis.
Figure 3B:
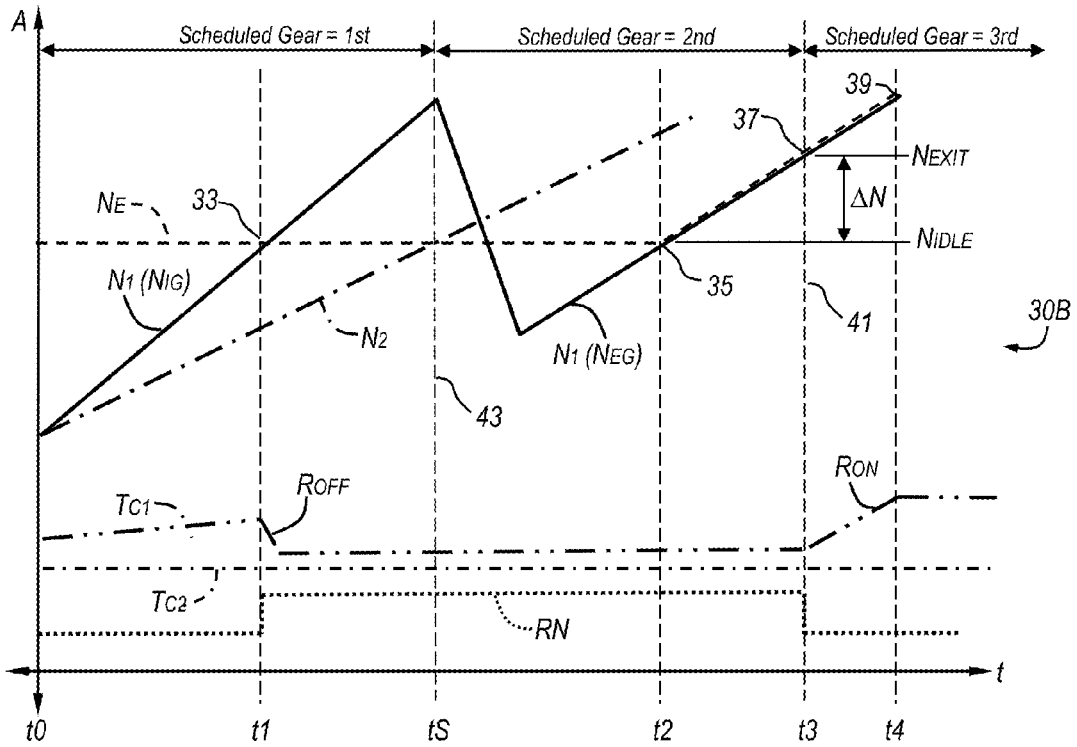
Figure 3C:
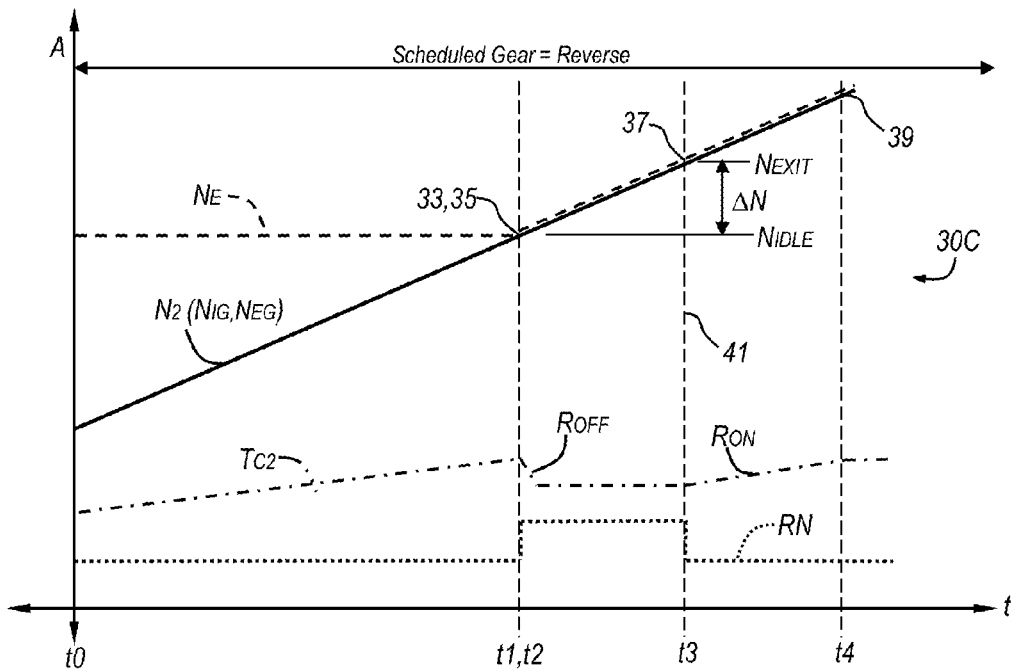

Using the control method of FIG. 2 as implemented via the DRSS profiles 30 of FIGS. 3A-3C, when a vehicle 10 starts rolling down an incline from a stop with no input from an acceleration pedal 13A of the vehicle 10, e.g., when the vehicle 10 is in a rolling downhill condition, the vehicle transmission 14 will be shifted from an initial gear state (IG) to a rolling neutral state (RN) only when the speed of the initial gear input shaft is equal to, e.g., crosses an idle speed of the engine 12, such that when the transmission 14 is shifted into the rolling neutral state (RN), engine braking is negligible. The initial gear input shaft is the one of the first and second gear input shafts 21, 23 corresponding to the initial gear state. In one example, the DCT 14 at the initiation of the rolling downhill condition is in first ($1^{st}$) gear in the initial gear state, such that the initial gear input shaft is the first gear input shaft 21. In another example, the DCT 14 at the initiation of the rolling downhill condition is in reverse (R) gear in the initial gear state, such that the initial gear input shaft is the second gear input shaft 23.

While the transmission 14 is in the rolling neutral state (RN), the engine 12 idles until the speed of an exit gear input shaft reaches, e.g., is equal to, the engine idle speed, at which point the engine speed matches the speed of the exit gear input shaft to prepare for an upcoming torque-interrupt shift to a predetermined exit gear state (EG). The predetermined exit gear is defined by a DRSS profile selected by the vehicle controller (C) 18 based on the initial gear state of the transmission 14 at initiation of the rolling downhill condition. The exit gear input shaft corresponds to the one of the first and second gear input shafts 21, 23 corresponding to the exit gear state. In one example, the initial gear state is first ($1^{st}$) gear, and the exit gear state is second ($2^{nd}$) gear, such that the exit gear input shaft is the second gear input shaft 23. In another example, the initial gear state is first ($1^{st}$) gear, and the exit gear state is third ($3^{rd}$) gear, such that the exit gear input shaft is the first gear input shaft 21. In another example, the initial and exit gear states are both reverse (R) gear, such that the initial gear input shaft and the exit gear input shaft are both the second gear input shaft 23.

The controller 18 commands synchronization of the engine speed and speed of the exit gear input shaft after the transmission 14 is transitioned into rolling neutral (RN). The transmission 14 remains in the rolling neutral state (RN) until the matched, e.g., synchronized, speed of the engine 12 and the exit gear shaft reaches, e.g., is equal to, a calibrated exit speed, at which time the controller 18 initiates engagement of the exit clutch and the exit gear input shaft, thereby terminating the rolling neutral state (RN). The controller 18 executes the shift from the rolling neutral state (RN) to the exit gear state (EG). The exit clutch is the one of the first clutch (C1) and second clutch (C2) corresponding to the exit gear input shaft. The exit gear clutch is ramped on with negligible engine braking when exiting from the rolling neutral state. In one example, the shift to the exit gear state may be executed as a torque-interrupt shift.

If the driver steps in during execution of the DRSS, e.g., if a driver input such as a throttle request (Th %>0) is received, for example, via a driver input to the accelerator pedal 13A, at any point while in the rolling downhill condition, a launch shift shall be performed to shift the transmission 14 into a gear state determined by the controller 18 to correspond to the driver input.

Using this control method, the rolling neutral state (RN) is only entered during a rolling downhill condition when engine braking is negligible, e.g., when the shaft speed of the initial gear shaft crosses the engine idle speed. The transmission 14 remains continuously in the rolling neutral state (RN) until the engine speed and the speed of the predetermined exit gear shaft are matched and at the calibrated exit speed, at which time the exit gear clutch is engaged to terminate the rolling neutral (RN) state and initiate the shift from the rolling neutral state (RN) to the exit gear state (EG). The control method of FIG. 2 as implemented via the DRSS profiles of FIGS. 3A-3C is therefore advantaged by avoiding any interim shifting out of and back into the rolling neutral (RN) state during the rolling downhill condition such that the vehicle user does not experience any output feel or harshness from interim shifts into and out of the rolling neutral state (RN) during the rolling downhill condition. Further, the control method described herein is advantaged by shifting in and out of the rolling neutral state (RN) with negligible or no engine braking, such that the vehicle user does not experience any output feel or harshness from the transmission 14 due to engine braking during the rolling downhill condition and the rolling downhill shift sequence.

Referring to FIG. 2, an example embodiment of the method 100 is shown. The controller 18 of FIG. 1 executes logic embodying the method 100 from its memory M to quickly select and execute a downhill rolling shift sequence (DRSS) when a rolling downhill condition is detected, to control the transmission of torque to the drive wheels of the vehicle 10. A torque handoff profile for the selected DRSS may be stored in the memory (M) of the controller 18, and may be referred to herein as a DRSS profile 30.

Referring to the example DRSS profiles 30A-30C shown in FIGS. 3A-3C, where time t is indicated on the horizontal axis and amplitude (A) is indicated on the vertical axis, the method 100 begins with step 102. At step 102, the controller 18 of FIG. 1 detects the vehicle 10 is in a rolling downhill condition at time t0. The rolling downhill condition may be detected by the controller 18 by processing all available inputs via the processor P, typically the throttle level (arrow Th %), braking level (arrow B %), vehicle speed (arrow $N_X$), initial gear (arrow IG), and any other useful information such as engine speed, input speed, and output speed, i.e., from respective engine, input and output speed sensors (not shown) positioned with respect to the shafts 15, 21, 23 and 20. Specifically, the term "rolling downhill condition" refers to a condition where the vehicle 10 is rolling down an incline from a stopped condition, e.g., where the initial vehicle speed (arrow $N_X$) is zero, there is no throttle request, e.g., there is no driver input to the accelerator such that the throttle level is at zero percent (Th %=0), and there is no braking input, e.g., there is no driver input to the vehicle brake such that the braking level is at zero percent (B %=0). At step 102, the controller 18 begins monitoring of the rotational speed of the input member 15 of FIG. 1, or the speed of the engine 12 of FIG. 1, which is shown as a trace $N_E$ on the DRSS profiles 30A-30C. As shown in the illustrative examples provided herein, engine speed monitoring and engine speed control are used in controlling some shift maneuvers during execution of a DRSS by the controller 18. At step 102, the controller 18 also begins monitoring of the rotational speed of the first and second gear input shafts 21, 23. On the DRSS profiles 30A-30C, the rotational speed of the first gear input shaft 21 is shown as a trace $N_1$, and the rotational speed of the second gear input shaft is shown as a trace $N_2$. Clutch torques (traces $T_{C1}$ and $T_{C2}$) are also shown indicating the clutch torque capacity of the input clutches C1 and C2 of FIG. 1, respectively, along with calibrated ramp profiles (traces $R_{ON}$ and $R_{OFF}$) as discussed below.

At step 104, the controller 18 detects the initial gear state (arrow IG) of the DCT 14, e.g., the gear state of the DCT 14 at the time t0 when the vehicle 10 begins rolling downhill from the stopped condition, e.g., at the initiation of the rolling downhill condition by the vehicle 10, and selects the downhill rolling shift profile 30 corresponding to the initial gear (IG) from one of a plurality of downhill rolling shift profiles 30 stored on the memory (M) of the controller 18. The term "downhill rolling shift," which may also be referred to herein as a downhill rolling shift sequence (DRSS), refers to a controlled shift sequence from an initial gear state (IG) to a rolling neutral state (RN) to an exit gear state (EG) which is performed while the vehicle 10 is in a rolling downhill condition. The plurality of calibrated DRSS profiles 30 stored on the memory (M) includes a forward DRSS profile, which may, in the example shown here, be one of the forward DRSS profiles 30A and 30B shown respectively in FIGS. 3A and 3B. The plurality of calibrated DRSS profiles 30 further includes a reverse DRSS profile, such as the example reverse DRSS profile 30C shown in FIG. 3C. The forward and reverse DRSS profiles 30 stored in the controller 18 may be calibrated for the vehicle 10, considering, for example, one or more characteristics of the vehicle 10 such as the type, weight, powertrain, etc. of the vehicle 10. When the controller 18 detects the vehicle 10 is in a forward gear such as $1^{st}$ gear at the initiation of the rolling downhill condition, the controller 18 at step 104 selects the forward DRSS profile, for example, one of the DRSS profiles 30A, 30B stored on the memory (M) of the vehicle 10, to execute and control a DRSS exiting to a forward exit gear. When the controller 18 detects the vehicle 10 is in reverse (R) gear at the initiation of the rolling downhill condition, the controller 18 at step 104 selects the reverse DRSS profile 30C stored on the memory (M) to execute and control a DRSS exiting to the reverse gear. The DRSS profile selected at step 104 by the controller 18 identifies a predetermined exit gear state (EG) corresponding to the initial gear state (IG), and provides instructions to be executed by the controller 18 to transition the transmission 14 from the initial gear state (IG) to a rolling neutral state (RN) when the speed of the initial gear input shaft reaches the idle speed of the engine, to command synchronization (speed matching) of the exit gear input shaft speed and the engine speed beginning when the DCT 14 is in the rolling neutral state (RN), and command initiation of and execute a shift of the DCT 14 from a rolling neutral state (RN) to the exit gear state (EG) when the synchronized speed of the exit gear input shaft and engine reaches a calibrated exit speed predetermined for the selected DRSS profile 30. In each DRSS profile, engine speed control is used for synchronization, e.g., speed matching of the engine speed to the speed of the exit gear shaft during execution of the DRSS to minimize engine braking and/or prevent transmitting an output feel to the driver of the vehicle 14 during execution of the DRSS.

The term "initial gear state" refers to the gear state the DCT 14 is in at the time the rolling downhill condition is initiated. In the "initial gear state" an "initial gear clutch" is applied to an "initial gear shaft" to engage an "initial gear set" connected to the "initial gear shaft." For example, using an example DCT 14 described herein, the DCT 14 in a forward rolling downhill condition may be in an "initial gear state" of 1st gear, such that, for the example DCT 14 described herein, the "initial gear input shaft" refers to the first gear input shaft 21 of the DCT 14, the "initial gear clutch" refers to the first clutch C1 of the DCT 14, and the "initial gear set" is the 1st gear set 16C of the DCT 14, such that in the initial gear state (IG) of 1st gear, the first clutch C1 is applied to the first gear input shaft 21 to engage the 1st gear set 16C of the DCT 14. Likewise, the term "exit gear state" refers to the gear state the DCT 14 is shifted to during execution of the downhill rolling shift sequence (DRSS). In the "exit gear state" an "exit gear clutch" is applied to an "exit gear shaft" to engage an "exit gear set" connected to the "exit gear shaft." For example, using an example DCT 14 described herein and the example DRSS profile 30A shown in FIG. 3A, the DCT 14 in a forward rolling downhill condition may be shifted from the initial gear state (IG) of $1^{st}$ gear to a rolling neutral state (RN), and from the rolling neutral state (RN) to an "exit gear state" of $2^{nd}$ gear, such that, in the present example, the "exit gear shaft" refers to the second gear input shaft 23 of the DCT 14, the "exit gear clutch" refers to the second clutch C2 of the DCT 14, and the "exit gear set" is the 2nd gear set 16F of the DCT 14, such that in the exit gear state (EG) of 2nd gear, the second clutch C2 is applied to the second gear input shaft 23 to engage the 2nd gear set 16F of the DCT 14. The term "rolling neutral state (RN)" refers to a condition where both the first and second clutches C1, C2 of the DCT 14 are neutralized such that neither of the first and second clutches C1, C2 are engaged with their respective first and second gear input shafts 21, 23, and such that there is no engine braking.

Referring to the DRSS profile 30A shown in FIG. 3A in a first illustrative example, at step 102 the controller 18 detects the vehicle 10 in a forward rolling downhill condition, and at step 104 detects the initial gear state of the DCT 14 as $1^{st}$ gear, and as such identifies the first gear input shaft 21 as the initial gear input shaft, and the first clutch C1 as the initial clutch. At step 104, the controller 18 selects for execution the forward DRSS profile 30A which is stored on the memory (M) of the controller 18. The exit gear state predetermined for the DRSS profile 30A is the $2^{nd}$ gear. The exit gear state may be predetermined, for example, for the vehicle 10 by calibration to determine the optimal exit gear state by which harshness, engine braking and/or output feel from the transmission 14 to the driver of the vehicle 10 during the DRSS can be minimized or made negligible.

At step 106 of the method 100 shown in FIG. 2, and still referring to the example DRSS profile 30A shown in FIG. 3A, the controller 18 monitors the engine speed (trace $N_E$). At the onset of the rolling downhill condition the engine speed ($N_E$) is at an idle speed $N_{IDLE}$. The controller 18 compares the speed of the initial gear input shaft, e.g., the speed of the first gear input shaft in the present example (trace $N_1(N_{IG})$), which is increasing from time t0 as the vehicle 10 progresses in the rolling downhill condition, with the engine idle speed (trace $N_E = N_{IDLE}$). When the speed $N_1(N_{IG})$ of the initial gear input shaft reaches and is equal to the engine idle speed, e.g., when trace $N_1(N_{IG})$ crosses trace $N_E = N_{IDLE}$ at point 33 and at time t1, as shown in FIG. 3A, the method continues to step 108.

At step 108 and at time t1, the controller 18 executes a first shift maneuver of the DRSS profile 30A at point 33, commanding the transmission 14 to transition from the initial gear state (IG), which is $1^{st}$ gear in the present example, to a rolling neutral (RN) state by commanding the initial clutch, which is the first clutch C1 to disengage from, e.g., ramp off ($R_{OFF}$) from, the initial input gear shaft, which is the first gear input shaft 21 in the present example, according to the trace $R_{OFF}$ shown in the DRSS profile 30A of FIG. 3A. At t1, with the first and second clutches C1 and C2 disengaged respectively from the first and second gear input shafts 21, 23, the transmission 14 is in rolling neutral (RN), as shown on the DRSS profile 30A, and will remain continuously in rolling neutral (RN) until time t3. In the example shown in FIG. 3A, torque is gradually released beginning at t1 from the initial clutch, e.g., the first clutch C1, which is the offgoing clutch for the shift from the initial gear (IG) state to the rolling neutral state (RN), according to the ramp-off trace $R_{OFF}$. The profile or slope of trace $R_{OFF}$ is predetermined and stored in memory (M) of the controller 18 to provide the desired shift feel, such that engine braking and/or any output feel from the transmission 14 to the vehicle driver is negligible and/or eliminated.

At step 110 of the method 100 shown in FIG. 2, and still referring to the example DRSS profile 30A shown in FIG. 3A, the controller 18 compares the speed of the exit gear (EG) input shaft, e.g., the speed of the second gear input shaft 23 in the present example (trace $N_2(N_{EG})$), which is increasing from time t0 as the vehicle 10 progresses in the rolling downhill condition, with the engine idle speed (trace $N_{IDLE}$). When the speed $N_2(N_{EG})$ of the exit gear input shaft reaches and is equal to the engine idle speed, e.g., when trace $N_2(N_{EG})$ crosses trace $N_E$ at point 35 at time t2, as shown in FIG. 3A, the method continues to step 112.

At step 112 and at time t2, the controller 18 commands the engine 12, for example, via transmission of a request to an engine control module, to begin a temporary increase $\Delta N$ in the engine speed $N_E$ to synchronize, e.g., speed match, the engine speed $N_E$ and the speed $N_2(N_{EG})$ of the exit gear input shaft, as shown at point 35 on the DRSS profile 30A, and the method continues to step 114.

At step 114, and still referring to the example DRSS profile 30A shown in FIG. 3A, the controller 18 compares the synchronized engine speed $N_E$ and exit gear input shaft speed $N_2(N_{EG})$ as the synchronized speed increases from time t2, to determine when the synchronized speed has reached a calibrated exit speed $N_{EXIT}$ at time t3, as shown at point 37 on the DRSS profile 30A. The calibrated exit speed may also be referred to herein as an exit speed target. The calibrated exit speed may be defined by a normal or scheduled synchronization point for a normal or scheduled shift to the exit gear, e.g., for a scheduled shift during a normal driving condition which is not a rolling downhill condition. For example, the calibrated exit speed shown at point 37 may be defined for the DRSS profile 30A by a 1-2 shift line 41, e.g., the shift line corresponding to a scheduled $1^{st}$ to $2^{nd}$ gear shift. When the synchronized speeds of the exit gear input shaft and engine 12 reach and equal the calibrated exit speed $N_{EXIT}$, e.g., when synchronized traces $N_2(N_{EG})$ and $N_E$ reach point 37 at time t3, as shown in FIG. 3A, the method continues to step 116.

At step 116 and at t3, the controller 18 executes a second shift maneuver of the DRSS 30A at point 37, commanding the transmission 14 to shift out of the rolling neutral (RN) state to the exit gear state (EG), which is $2^{nd}$ gear in the present example, by commanding the exit clutch, which is the second clutch C2 corresponding to the $2^{nd}$ (exit) gear, to engage, e.g., gradually ramp on to ($R_{ON}$) the exit input gear shaft, which is the second gear input shaft 23 in the present example, according to the trace $R_{ON}$ shown in the DRSS profile 30A of FIG. 3A. The profile or slope of trace $R_{ON}$ is predetermined and stored in memory (M) of the controller 18 to provide the desired shift feel, such that engine braking and/or any output feel from the transmission 14 to the vehicle driver is negligible and/or eliminated during the transition from the rolling neutral state (RN) to the exit gear state (EG).

At step 118, the controller 18 commands, beginning at time t3, a gradual increase in the torque from the exit clutch, e.g., the second clutch C2, which is the oncoming clutch for the shift from the rolling neutral state (RN) to the exit gear (EG) state, according to the ramp-on trace $R_{ON}$, to complete the shift to the exit gear state at point 39 and time t4. The shift to the exit gear state (EG) may be performed as a torque-interrupt shift. Gradual ramping on of the exit gear clutch minimizes and/or prevents generation of an output feel to the driver during execution of the DRSS.

Steps 116 and 118 may include, for instance, applying the exit clutch, in the present example, the second clutch C2 via transmission of clutch position control signals (arrow $P_X$) to the clutch actuator used for the exit clutch, as well as hydraulic control of the associated forks and synchronizer(s) 19 needed for the shift to the exit gear. The method begins anew at step 102, with the controller 18 monitoring for the occurrence of a rolling downhill condition.

If the driver steps in during execution of the method 100, for instance, during execution of the DRSS profile 30, the controller 18 commands a launch shift to be performed and the method begins anew at step 102, with the controller 18 monitoring for the occurrence of a rolling downhill condition. For example, if a driver input such as a throttle request (Th %>0) is received by the controller 18, for instance, via a driver input to the accelerator pedal 13A, at any point while in the rolling downhill condition, a launch shift shall be performed to shift the transmission 14 into a gear state determined by the controller 18 to correspond to the driver input.

Referring now to a second example of a forward DRSS profile 30B shown in FIG. 3B and in a second illustrative example of the method 100 shown in FIG. 2, at step 102 the controller 18 detects the vehicle 10 in a forward rolling downhill condition, and at step 104 detects the initial gear state of the DCT 14 as $1^{st}$ gear, and as such identifies the first gear input shaft 21 as the initial gear input shaft, and the first clutch C1 as the initial clutch. At step 104, the controller 18 selects for execution the forward DRSS profile 30B which is stored on the memory (M) of the controller 18 of the vehicle 10. The exit gear state predetermined for the DRSS profile 30B is the $3^{rd}$ gear. The exit gear state may be predetermined, for example, for the vehicle 10 by calibration to determine the optimal exit gear state by which harshness, engine braking and/or output feel from the transmission 14 to the driver of the vehicle 10 during the DRSS can be minimized or made negligible. In the example illustrated by the DRSS profile 30B of FIG. 3B, the DCT 14 in the first shift maneuver at time t1 shifts the transmission 14 from an initial gear state (IG) of $1^{st}$ gear to rolling neutral (RN). The transmission 14 remains in the rolling neutral state (RN) from time t1 until time t3, when the controller 18 executes a second shift maneuver of the transmission 14 from the rolling neutral state (RN) directly to 3rd gear, the predetermined exit gear state (EG) in this example. An interim shift to $2^{nd}$ gear is not performed in this example, such that any output feel, engine braking, or harshness which may be experienced by performing an interim shift to $2^{nd}$ gear between times t1 and t3 in the rolling downhill condition is avoided.

At step 106 of the method 100, and still referring to the example DRSS profile 30B shown in FIG. 3B, the controller 18 monitors the engine speed (trace $N_E$), where at the onset of the rolling downhill condition the engine speed ($N_E$) is at an idle speed $N_{IDLE}$. The controller 18 compares the speed of the initial gear input shaft, e.g., the speed of the first gear input shaft in the present example (trace $N_1(N_{IG})$), which is increasing from time t0 as the vehicle 10 progresses in the rolling downhill condition, with the engine idle speed ($N_E = N_{IDLE}$). When the speed $N_1(N_{IG})$ of the initial gear input shaft reaches and is equal to the engine idle speed, e.g., when trace $N_1(N_{IG})$ crosses trace $N_E = N_{IDLE}$ at point 33 and at time t1, as shown in FIG. 3B, the method continues to step 108.

At step 108 and at time t1, the controller 18 executes a first shift maneuver of the DRSS profile 30B at point 33, commanding the transmission 14 to transition from the initial gear state (IG), which is $1^{st}$ gear in the present example, to a rolling neutral (RN) state by commanding the initial clutch, which is the first clutch C1 to disengage from, e.g., ramp off ($R_{OFF}$) from, the initial input gear shaft, which is the first gear input shaft 21 in the present example, according to the trace $R_{OFF}$ shown in the DRSS profile 30B of FIG. 3B. At t1, with the first and second clutches C1 and C2 disengaged respectively from the first and second gear input shafts 21, 23, the transmission 14 is in rolling neutral (RN), as shown on the DRSS profile 30B. In the example shown in FIG. 3B, torque is gradually released beginning at t1 from the initial clutch, e.g., the first clutch C1, which is the offgoing clutch for the shift from the initial gear (IG) state to the rolling neutral state (RN), according to the ramp-off trace $R_{OFF}$. The profile or slope of trace $R_{OFF}$ is predetermined and stored in memory (M) of the controller 18 to provide the desired shift feel, such that engine braking and/or any output feel from the transmission 14 to the vehicle driver is negligible and/or eliminated. The transmission 14 is in rolling neutral (RN), as shown on the DRSS profile 30B, and will remain continuously in rolling neutral (RN) until time t3. In this instance, as shown in FIG. 3B, an interim shift to $2^{nd}$ gear defined by the 1-2 shift line 43, which would be a scheduled shift at time tS during normal, e.g., non-rolling downhill, driving conditions, is not performed, such that any output feel, engine braking, or harshness which may be experienced by performing an interim shift to $2^{nd}$ gear between times t1 and t3 in the rolling downhill condition is avoided.

At step 110 of the method 100, and still referring to the example DRSS profile 30B shown in FIG. 3B, the controller 18 compares the speed of the exit gear (EG) input shaft, e.g., the speed of the first gear input shaft 21 in the present example (trace $N_1(N_{EG})$), with the engine idle speed ($N_E = N_{IDLE}$). When the speed $N_1(N_{EG})$ of the exit gear input shaft reaches and is equal to the engine idle speed, e.g., when trace $N_1(N_{EG})$ crosses trace $N_E$ at point 35 at time t2, as shown in FIG. 3B, the method continues to step 112.

At step 112 and at time t2, the controller 18 commands the engine 12, for example, via transmission of a request to an engine control module, to begin a temporary increase $\Delta N$ in the engine speed $N_E$ to synchronize, e.g., speed match, the engine speed $N_E$ and the speed $N_1(N_{EG})$ of the exit gear input shaft, as shown at point 35 on the DRSS profile 30B, and the method continues to step 114.

At step 114, and still referring to the example DRSS profile 30B shown in FIG. 3B, the controller 18 compares the synchronized engine speed $N_E$ and exit gear input shaft speed $N_1(N_{EG})$ as the synchronized speed increases from time t2, to determine when the synchronized speed has reached a calibrated exit speed $N_{EXIT}$ at time t3, as shown at point 37 on the DRSS profile 30B. The calibrated exit speed may be defined by a normal or scheduled synchronization point for a normal or scheduled shift to the exit gear, e.g., for a scheduled shift during a normal driving condition which is not a rolling downhill condition. For example, the calibrated exit speed shown at point 37 may be defined for the DRSS profile 30B by a 2-3 shift line 41, e.g., the shift line corresponding to a scheduled $2^{nd}$ to $3^{rd}$ gear shift. When the synchronized speeds of the exit gear input shaft, e.g., the first gear input shaft 21, and engine 12 reach and equal the calibrated exit speed $N_{EXIT}$, e.g., when synchronized traces $N_1(N_{EG})$ and $N_E$ reach point 37 at time t3, as shown in FIG. 3B, the method continues to step 116.

At step 116 and at t3, the controller 18 executes a second shift maneuver of the DRSS profile 30B at point 37, commanding the transmission 14 to shift out of the rolling neutral (RN) state to the exit gear state (EG), which is $3^{rd}$ gear in the present example, by commanding the exit clutch, which is the first clutch C1 corresponding to the 1st (exit) gear, e.g., to gradually ramp-on ($R_{ON}$) to the exit input gear shaft, which is the first gear input shaft 21 in the present example, according to the trace $R_{ON}$ shown in the DRSS profile 30B of FIG. 3B. The profile or slope of trace $R_{ON}$ is predetermined and stored in memory (M) of the controller 18 to provide the desired shift feel, such that engine braking and/or any output feel from the transmission 14 to the vehicle driver is negligible and/or eliminated during the transition from the rolling neutral state (RN) to the exit gear state (EG).

At step 118, the controller 18 commands, beginning at time t3, a gradual increase in the torque from the exit clutch, e.g., the first clutch C1, which is the oncoming clutch for the shift from the rolling neutral state (RN) to the exit gear (EG) state, according to the ramp-on trace $R_{ON}$, to complete the shift to the exit gear state of $3^{rd}$ gear at point 39 and time t4. The shift to the exit gear state (EG) may be performed as a torque-interrupt shift. Gradual ramping on of the exit gear clutch minimizes and/or prevents generation of an output feel to the driver during execution of the DRSS.

Steps 116 and 118 may include, for instance, applying the exit clutch, in the present example, the first clutch C1 via transmission of clutch position control signals (arrow $P_X$) to the clutch actuator used for the exit clutch, as well as hydraulic control of the associated forks and synchronizer(s) 19 needed for the shift to the exit gear. The method begins anew at step 102, with the controller 18 monitoring for the occurrence of a rolling downhill condition. As previously described, if the driver steps in during execution of the method 100, for instance, during execution of the DRSS profile 30, the controller 18 commands a launch shift to be performed and the method begins anew at step 102, with the controller 18 monitoring for the occurrence of a rolling downhill condition.

Referring now to FIG. 3C, shown is an example of a reverse DRSS profile 30C which is executable by the controller 18 in the instance where the controller 18, at step 2 of the method 100 shown in FIG. 2, detects the vehicle 10 in a reverse rolling downhill condition. As previously described, the controller 18 in a vehicle 10 will have stored in memory (M) a forward DRSS profile such as one of the DRSS profiles 30A, 30B, and will also have stored in memory (M) a reverse DRSS profile such as the DRSS profile 30C shown in FIG. 3C. At step 104, in the current example shown in FIG. 3C, the controller 18 will have detected the initial gear state of the DCT 14 as the reverse (R) gear, identifying the vehicle 10 as rolling downhill in reverse in the rolling downhill condition. In this instance, the controller 18 identifies the second gear input shaft 23 as the initial gear input shaft, and the second clutch C2 as the initial clutch. At step 104, the controller 18 selects for execution the reverse DRSS profile 30C which is stored on the memory (M) of the controller 18 of the vehicle 10. The exit gear state predetermined for the reverse DRSS profile 30C is the reverse gear (R), such that the second clutch C2 is respectively the initial clutch and the exit clutch, the second gear input shaft 23 of the DCT 14 is respectively the initial gear shaft and the exit gear shaft, and the reverse (R) gear set is respectively the initial gear set and the exit gear set for executing the reverse DRSS profile 30C. For illustration clarity, the traces C1 and N1 are not shown in the reverse DRSS 30C of FIG. 3C, as in this instance, e.g., during execution of the reverse DRSS 30C, the first clutch C1 remains disengaged from the first input gear shaft 21. In the example illustrated by the reverse DRSS profile 30C of FIG. 3C, the DCT 14 in the first shift maneuver at time t1 shifts the transmission 14 from the initial gear state (IG) of reverse (R) gear to rolling neutral (RN). The transmission 14 remains in the rolling neutral state (RN) from time t1 until time t3, when the controller 18 executes a second shift maneuver of the transmission 14 from the rolling neutral state (RN) back into the reverse (R) gear, the predetermined exit gear state (EG) in this example.

At steps 106 and 110, which occur concurrently at time t1,t2 in the example DRSS profile 30C, the controller 18 monitors the engine speed (trace $N_E$), where at the onset of the rolling downhill condition the engine speed ($N_E$) is at an idle speed $N_{IDLE}$. In this instance, time t1 and time t2 are the same, e.g., occur at the same time in execution of the reverse DRSS profile 30C, and points 33, 35 occur at the same time in the reverse DRSS profile 30C, e.g., are coincident, as shown in FIG. 3C, where the reverse (R) gear is both the initial and exit gear state, and the second gear shaft 23 is both the initial and exit gear shaft, such that $N2=N_{IG}=N_{EG}$. The controller 18 compares the speed ($N_2(N_{IG}, N_{EG})$) of the second gear input shaft 23, which is increasing from time t0 as the vehicle 10 progresses in reverse in the rolling downhill condition, with the engine idle speed ($N_E=N_{IDLE}$). When the speed $N_2(N_{IG}, N_{EG})$ of the second gear input shaft 23 reaches and is equal to the engine idle speed, e.g., when trace $N_2(N_{IG}, N_{EG})$ crosses trace $N_E=N_{IDLE}$ at point 33, 35 and at time t1,t2 as shown in FIG. 3C, the method continues to steps 108 and 112, which, because the initial gear state (IG) and exit gear state (EG) are the same, e.g., are both the reverse (R) gear state, are executed concurrently by the controller 18.

At steps 108 and 112, which occur concurrently at time t1,t2, the controller 18 executes a first shift maneuver of the DRSS profile 30C at point 33,35 commanding the transmission 14 to transition from the initial gear state (IG) of reverse (R) gear in the present example, to a rolling neutral (RN) state by commanding the initial clutch, which is the second clutch C2 to disengage from, e.g., ramp-off ($R_{OFF}$) from, the (initial) second gear input shaft 23, according to the trace $R_{OFF}$ shown in the DRSS profile 30C of FIG. 3C. At time t1,t2, with the first and second clutches C1 and C2 disengaged respectively from the first and second gear input shafts 21, 23, the transmission 14 is in rolling neutral (RN), as shown on the DRSS profile 30C. In the example shown in FIG. 3C, torque is gradually released beginning at time t1,t2 from the initial clutch, e.g., the second clutch C2, which is the offgoing clutch for the shift from the initial gear (IG) state to the rolling neutral state (RN), according to the ramp-off trace $R_{OFF}$. The profile or slope of trace $R_{OFF}$ is predetermined and stored in memory (M) of the controller 18 to provide the desired shift feel, such that engine braking and/or any output feel from the transmission 14 to the vehicle driver is negligible and/or eliminated. The transmission 14 remains in rolling neutral (RN), as shown on the DRSS profile 30C, continuously until time t3. At step 112 and concurrent with step 108 at time t1,t2, the controller 18 commands the engine 12, for example, via transmission of a request to an engine control module, to begin a temporary increase $\Delta N$ in the engine speed $N_E$ to synchronize, e.g., speed match, the engine speed $N_E$ and the speed $N_2(N_{IG}, N_{EG})$ of the exit gear input shaft, as shown at point 33,35 on the DRSS profile 30C, and the method continues to step 114.

At step 114, and still referring to the example DRSS profile 30C shown in FIG. 3C, the controller 18 compares the synchronized engine speed $N_E$ and exit gear input shaft speed $N_2(N_{IG}, N_{EG})$ as the synchronized speed increases from time t1,t2, to determine when the synchronized speed has reached a calibrated exit speed $N_{EXIT}$ at time t3, as shown at point 37 on the DRSS profile 30B. The calibrated exit speed for the reverse DRSS profile 30C is a calibrated speed which is greater than the engine idle speed ($N_{IDLE}$) and may be optimized to provide the desired shift feel, such that engine braking and/or any output feel from the transmission 14 to the vehicle driver is negligible and/or eliminated when the second shift maneuver to the reverse gear (R) state is executed at step 116. When the synchronized speeds of the exit gear input shaft, e.g., the second gear input shaft 23, and engine 12 reach and equal the calibrated exit speed $N_{EXIT}$, e.g., when synchronized traces $N_2(N_{IG}, N_{EG})$ and $N_E$ reach point 37 at time t3, as shown in FIG. 3C, the method continues to step 116.

At step 116 and at t3, the controller 18 executes a second shift maneuver of the reverse profile DRSS 30C at point 37, commanding the transmission 14 to shift out of the rolling neutral (RN) state to the reverse exit gear state (EG), by commanding the exit clutch, which is the second clutch C2 corresponding to the reverse (exit) gear, e.g., to gradually ramp-on ($R_{ON}$) to the exit input gear shaft (the second gear input shaft 23 in the present example), according to the trace $R_{ON}$ shown in the DRSS profile 30C of FIG. 3C. The profile or slope of trace $R_{ON}$ is predetermined and stored in memory (M) of the controller 18 to provide the desired shift feel, such that engine braking and/or any output feel from the transmission 14 to the vehicle driver is negligible and/or eliminated during the transition from the rolling neutral state (RN) to the reverse exit gear state (EG).

At step 118, the controller 18 commands, beginning at time t3, a gradual increase in the torque from the exit clutch, e.g., the second clutch C2, which is the oncoming clutch for the shift from the rolling neutral state (RN) to the exit gear (EG) state, according to the ramp-on trace $R_{ON}$, to complete the shift to the exit gear state of reverse (R) gear at point 39 and time t4. The shift to the exit gear state (EG) may be performed as a torque-interrupt shift. Gradual ramping on of the exit gear clutch minimizes and/or prevents generation of an output feel to the driver during execution of the DRSS.

Steps 116 and 118 may include, for instance, applying the exit clutch, in the present example, the second clutch C2, via transmission of clutch position control signals (arrow $P_X$) to the clutch actuator used for the exit clutch, as well as hydraulic control of the associated forks and synchronizer(s) 19 needed for the shift to the exit gear. The method begins anew at step 102, with the controller 18 monitoring for the occurrence of a rolling downhill condition. As previously described, if the driver steps in during execution of the method 100, for instance, during execution of the DRSS profile 30, the controller 18 commands a launch shift to be performed and the method begins anew at step 102, with the controller 18 monitoring for the occurrence of a rolling downhill condition.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
an engine operable at an engine speed;
a dual-clutch transmission (DCT) having first and second input clutches, first and second gear input shafts, and a gearbox that contains separate oddly-numbered and evenly-numbered forward gear sets disposed on a corresponding one of the first and second gear input shafts and a reverse gear set disposed on the second gear input shaft, wherein an application of a designated one of the first and second input clutches connects the engine to a corresponding one of the first and second gear input shafts; and
a controller in communication with the pair of input clutches;
wherein the controller includes a processor and tangible, non-transitory memory on which is recorded instructions for executing a downhill rolling shift sequence (DRSS) of the DCT;
wherein execution of the instructions causes the controller to:
detect a rolling downhill condition wherein in the rolling downhill condition an initial gear input shaft is engaged by an initial clutch such that the DCT is in an initial gear state;
wherein the initial gear input shaft is one of the first and second gear input shafts and the initial clutch is one of the first and second input clutches corresponding to the initial gear input shaft;
identify an exit gear state corresponding to the initial gear state;
wherein an exit gear input shaft engages an exit clutch to transition the DCT to the exit gear state;
wherein the exit gear input shaft is one of the first and second gear input shafts and the exit clutch is one of the first and second input clutches corresponding to the exit gear input shaft;
shift the DCT from the initial gear state to a rolling neutral state when a speed of the initial gear input shaft is equal to an idle speed of the engine;
initiate synchronization of the speed of the engine with a speed of the exit gear input shaft when the rotation speed of the exit gear input shaft is equal to the idle speed of the engine, to thereby synchronize the speed of the engine with the speed of the exit gear input shaft at a calibrated exit speed needed for achieving the exit gear state; and
shift the DCT from the rolling neutral state to the exit gear state when the synchronized speed of the engine and the exit gear input shaft is equal to the calibrated exit speed.

2. The vehicle of claim 1, wherein:
the DCT is in a rolling neutral state when the first input clutch is disengaged from the first gear input shaft and the second input clutch is disengaged from the second gear input shaft; and
the DCT is in a rolling downhill condition when the vehicle begins rolling down an incline from a stopped condition with a throttle level of zero and a braking level of zero.

3. The vehicle of claim 1, wherein:
shifting the DCT from the initial gear state to the rolling neutral state comprises ramping off the initial input clutch from the initial gear input shaft; and
shifting the DCT from the rolling neutral state to the exit gear state comprises ramping on the exit input clutch to the exit gear input shaft.

4. The vehicle of claim 1, wherein shifting the DCT from the initial gear state to the rolling neutral state to the exit gear state is executed without engine braking.

5. The vehicle of claim 1, wherein the controller is programmed with a forward DRSS shift profile;
wherein execution of the instructions causes the controller to execute the forward DRSS shift profile when the initial gear state is a forward gear state.

6. The vehicle of claim 5, wherein the controller is programmed with a plurality of DRSS shift profiles including the forward DRSS shift profile and a reverse DRSS shift profile;
wherein execution of the instructions causes the controller to execute the reverse DRSS shift profile when the initial gear state is a reverse gear state.

7. The vehicle of claim 1, wherein the initial gear state is a forward gear state, and the DCT in the exit gear state is in second ($2^{nd}$) gear.

8. The vehicle of claim 1, wherein the initial gear state is a forward gear state, and the DCT in the exit gear state is in third ($3^{rd}$) gear.

9. The vehicle of claim 1, wherein the initial gear state is first (1st) gear, and the DCT in the exit gear state is in one of second ($2^{nd}$) gear and third ($3^{rd}$) gear.

10. The vehicle of claim 1, wherein the initial gear input shaft is the first gear shaft and the exit gear shaft is the second gear shaft.

11. The vehicle of claim 1, wherein the initial gear input shaft is the first gear shaft and the exit gear shaft is the first gear shaft.

12. The vehicle of claim 1, wherein the initial gear state is a reverse gear state, and the exit gear state is the reverse gear state.

13. The vehicle of claim 1, wherein execution of the instructions causes the controller to abort execution of the DRSS and perform a launch shift upon detection of a throttle request for a throttle level greater than zero.

14. A method of controlling a downhill rolling shift sequence (DRSS) of a vehicle having an engine and a dual-clutch transmission (DCT), wherein the downhill rolling shift sequence (DRSS) is initiated upon detection of a rolling downhill condition of the vehicle, the method comprising:
detecting the rolling downhill condition via a controller;
wherein in the rolling downhill condition an initial gear input shaft is engaged by an initial clutch such that the DCT is in an initial gear state;

wherein the initial gear input shaft is one of a first and a second gear input shaft of the DCT and the initial clutch is one of a first and a second input clutch of the DCT corresponding to the initial gear input shaft;

identifying, via the controller, an exit gear state corresponding to the initial gear state;

wherein an exit gear input shaft engages an exit clutch to transition the DCT to the exit gear state;

wherein the exit gear input shaft is one of the first and second gear input shafts and the exit clutch is one of the first and second input clutches corresponding to the exit gear input shaft;

shifting the DCT from the initial gear state to a rolling neutral state when a speed of the initial gear input shaft is equal to an idle speed of the engine;

initiating synchronization of the speed of the engine with a speed of the exit gear input shaft when the speed of the exit gear input shaft is equal to the idle speed of the engine, to thereby synchronize the speed of the engine with the speed of the exit gear input shaft at a calibrated exit speed needed for achieving the exit gear state; and shifting the DCT from the rolling neutral state to the exit gear state when the synchronized speed of the engine and the exit gear input shaft is equal to the calibrated exit speed.

15. The method of claim 14, wherein shifting the DCT from the initial gear state to the rolling neutral state to the exit gear state is executed without engine braking.

16. The method of claim 14, wherein the initial gear state is a forward gear state, and the DCT in the exit gear state is in second ($2^{nd}$) gear.

17. The method of claim 14, wherein the initial gear state is a forward gear state, and the DCT in the exit gear state is in third ($3^{rd}$) gear.

18. The method of claim 14, wherein the initial gear state is first (1st) gear, and the DCT in the exit gear state is in one of second ($2^{nd}$) gear and third ($3^{rd}$) gear.

19. The method of claim 14, wherein the initial gear state is a reverse gear state, and the exit gear state is the reverse gear state.

20. The method of claim 14, further comprising:

detecting a throttle request for a throttle level greater than zero; and aborting execution of the DRSS and performing a launch shift upon detection of the throttle request.

* * * * *